United States Patent [19]
Sun

[11] Patent Number: 6,101,505
[45] Date of Patent: Aug. 8, 2000

[54] METHOD OF MANAGING FILES OF A PORTABLE INFORMATION TERMINAL ACCORDING TO AVAILABLE MEMORY

[75] Inventor: Ho-kyung Sun, Suwon, Rep. of Korea

[73] Assignee: Samsung Electronics Co., Ltd., Kyungki-Do, Rep. of Korea

[21] Appl. No.: 09/052,099

[22] Filed: Mar. 31, 1998

[30] Foreign Application Priority Data

Apr. 11, 1997 [KR] Rep. of Korea ...................... 97-13417

[51] Int. Cl.⁷ .................................................. G06F 12/00
[52] U.S. Cl. ............................ 707/203; 707/10; 711/171
[58] Field of Search ................................. 707/3, 10, 203, 707/200; 711/115, 171, 172; 395/200.47, 200.33

[56] References Cited

U.S. PATENT DOCUMENTS

| | | | |
|---|---|---|---|
| 4,812,843 | 3/1989 | Champion, III et al. | 340/905 |
| 5,337,044 | 8/1994 | Folger et al. | 340/825.44 |
| 5,339,400 | 8/1994 | Iijima | 711/115 |
| 5,666,530 | 9/1997 | Clarke et al. | 707/201 |
| 5,680,548 | 10/1997 | Trugman | 709/226 |
| 5,699,275 | 12/1997 | Beasley et al. | 709/221 |
| 5,864,853 | 1/1999 | Kimura et al. | 707/10 |
| 5,923,735 | 7/1999 | Swartz et al. | 379/93.12 |
| 5,926,624 | 7/1999 | Katz et al. | 395/200.47 |

FOREIGN PATENT DOCUMENTS

| | | | |
|---|---|---|---|
| 0 773 503 | 5/1997 | European Pat. Off. | G06F 17/30 |
| WO 91/02313 | 2/1991 | WIPO | G06F 15/16 |
| WO 94/25923 | 11/1994 | WIPO | G06F 15/21 |
| WO 96/32679 | 10/1996 | WIPO | G06F 13/00 |

*Primary Examiner*—Jean R. Homere
*Attorney, Agent, or Firm*—Sughrue, Mion, Zinn, Macpeak & Seas, PLLC

[57] ABSTRACT

A method of managing files of a portable information terminal and automatically upgrading a program installed on the portable information terminal to the most recent version. The method consists of comparing a memory size of files to be changed in the portable information terminal with a size of memory available in the portable information terminal, generating a list of files to be changed, updating information on a memory size of the portable information terminal in a master server when the files are to be changed in the portable information terminal, and storing the generated list of files in a specific directory of the master server and transferring the list of files to be changed to the portable information terminal when the files are transferred to the portable information terminal.

8 Claims, 5 Drawing Sheets

METHOD OF MANAGING FILES OF A PORTABLE INFORMATION TERMINAL ACCORDING TO AVAILABLE MEMORY

BACKGROUND OF THE INVENTION

1. Field of the Invention

The present invention relates to a method of managing files of a portable information terminal, and more particularly, to a method of automatically upgrading a program installed in a portable information terminal to a most recent version. The present application is based upon Korean Application No. 97-13417, which is incorporated herein by reference.

2. Description of the Related Art

In general, a portable information terminal is a multimedia product having functions of a cellular phone, a wireless facsimile, a radio pager, and an electronic organizer. It is possible to send document information to a master server and retrieve document information from the master server regardless of the time or location using the portable information terminal. Also, it is possible to detect and receive information from a data base connected to a personal computer (PC).

FIG. 1 shows the structure of a general network comprised of servers and portable information terminals. Files commonly used by all portable terminals are stored in a common directory of a master server 110. Personal files of individual users (i.e., user 1, user 2, etc.) are stored in a private directory of the master server 110. Local servers 120 receive common files and personal files of users from the master server 110, store them in the directories of the respective users (user 1, user 2, etc.) and transfer relevant files when the portable information terminals 130 are connected to the local servers 120.

When files to be installed in a portable information terminal 130 are recorded in the private directory of the master server 110, the respective local servers 120 receive the files and transfer them to the user directories. When the portable information terminals 130 are connected to the local servers 120, the users receive the files from the directories. Here, the files are transferred in a directory unit since they are related to each other. That is, the transfer of the files is completed when all of the files in the directory are transferred. The files in the concerned directories of the local servers 120 are deleted after the files are transferred to the portable information terminal 130. Therefore, the portable information terminal 130 needs temporary memory for receiving files. However, the master server 110 cannot transfer additional or amended program files to the portable information terminal 130 if the size of the program files is larger than the memory available in the portable terminal 130.

SUMMARY OF THE INVENTION

It is an object of the present invention to provide a method of automatically upgrading an installed file to the most recent version without interacting with a user in a portable information terminal in which memory is restricted when a file is added, amended, or deleted.

To achieve the above object, there is provided a method of managing files of a portable information terminal, comprising the steps of comparing a memory size of files to be changed in the portable information terminal with a size of memory available in the portable information terminal, generating a list of files to be changed, updating information on a memory size of the portable information terminal in a master server when the files are to be changed in the portable information terminal, and storing the generated list of files in a specific directory of the master server and transferring the list of files to be changed to the portable information terminal when the files are transferred to the portable information terminal.

BRIEF DESCRIPTION OF THE DRAWING(S)

The above object and advantages of the present invention will become more apparent by describing in detail a preferred embodiment thereof with reference to the attached drawings in which.

DETAILED DESCRIPTION OF THE PREFERRED EMBODIMENT

Figure 1:
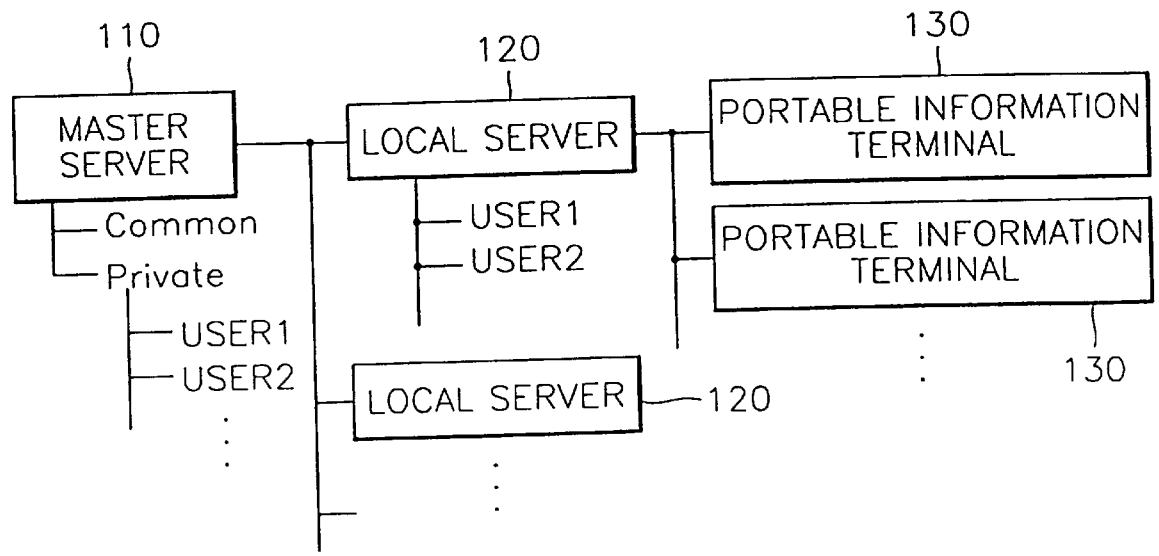
FIG. 1 shows the structure of a general network of servers and portable information terminals.
Figure 2:
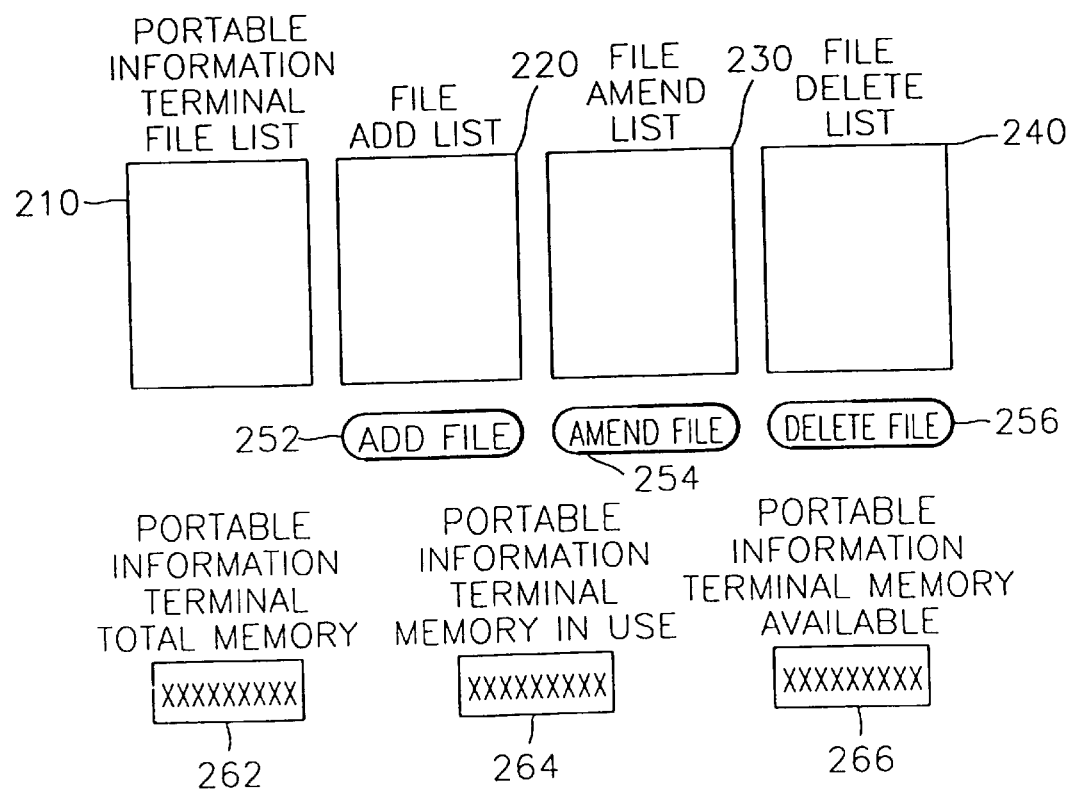
FIG. 2 shows the structure of an interface screen in a master server for managing files to be installed in a portable information terminal according to the present invention.

FIG. 2 shows the structure of an interface screen of a master server for managing files to be installed in a portable information terminal according to the present invention. The interface screen includes a portable information terminal file list display portion 210, a file add list display portion 220, a file amend list display portion 230, a file delete list display portion 240, a file add key 252, a file amend key 254, a file delete key 256, a portable information terminal total memory display portion 262, a portable information terminal memory in use display portion 264, and a portable information terminal memory available display portion 266.

Figure 3A:
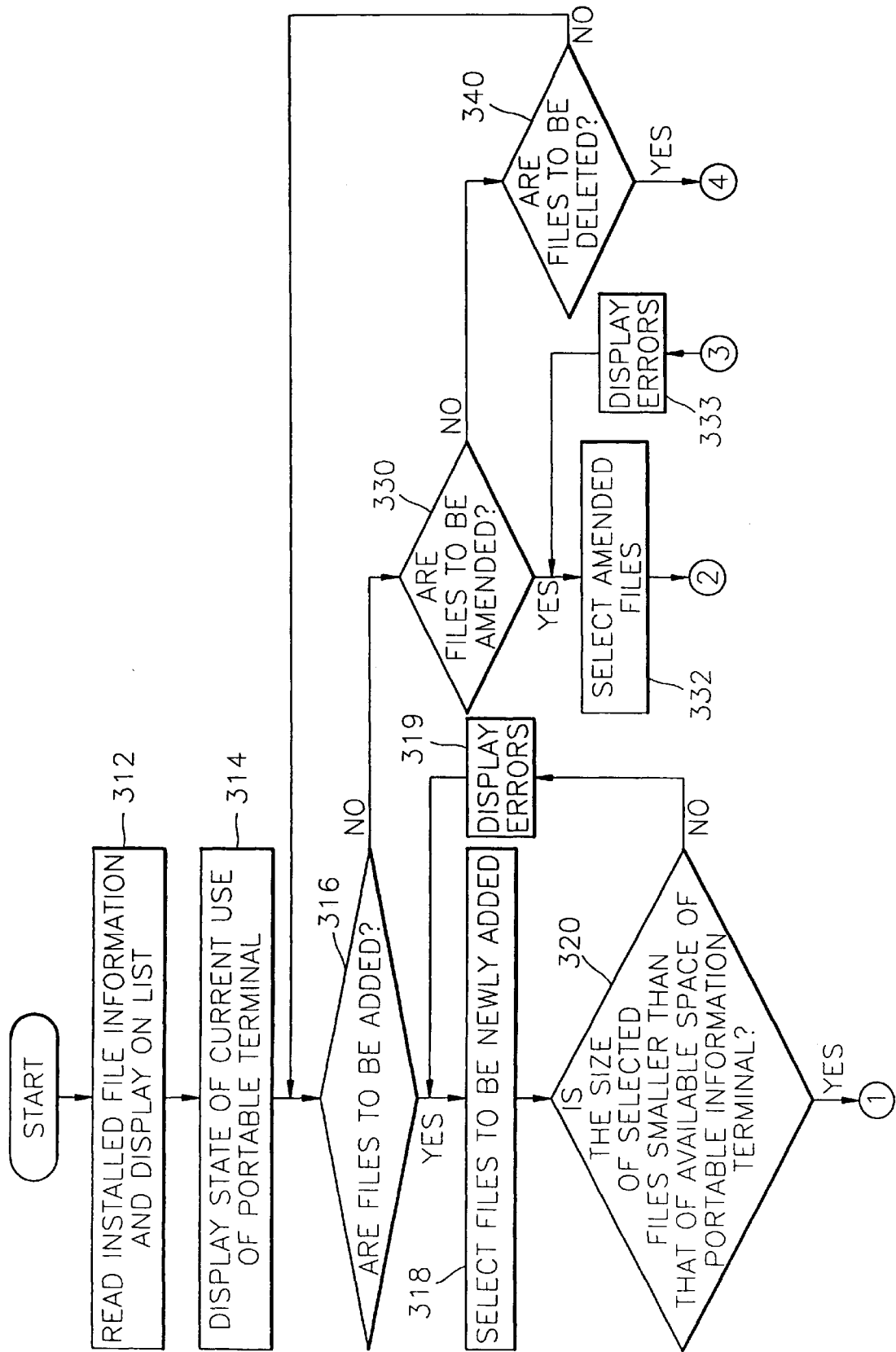
FIGS. 3A and 3B are a flowchart showing a method for managing files to be installed in a portable information terminal.
Figure 3B:
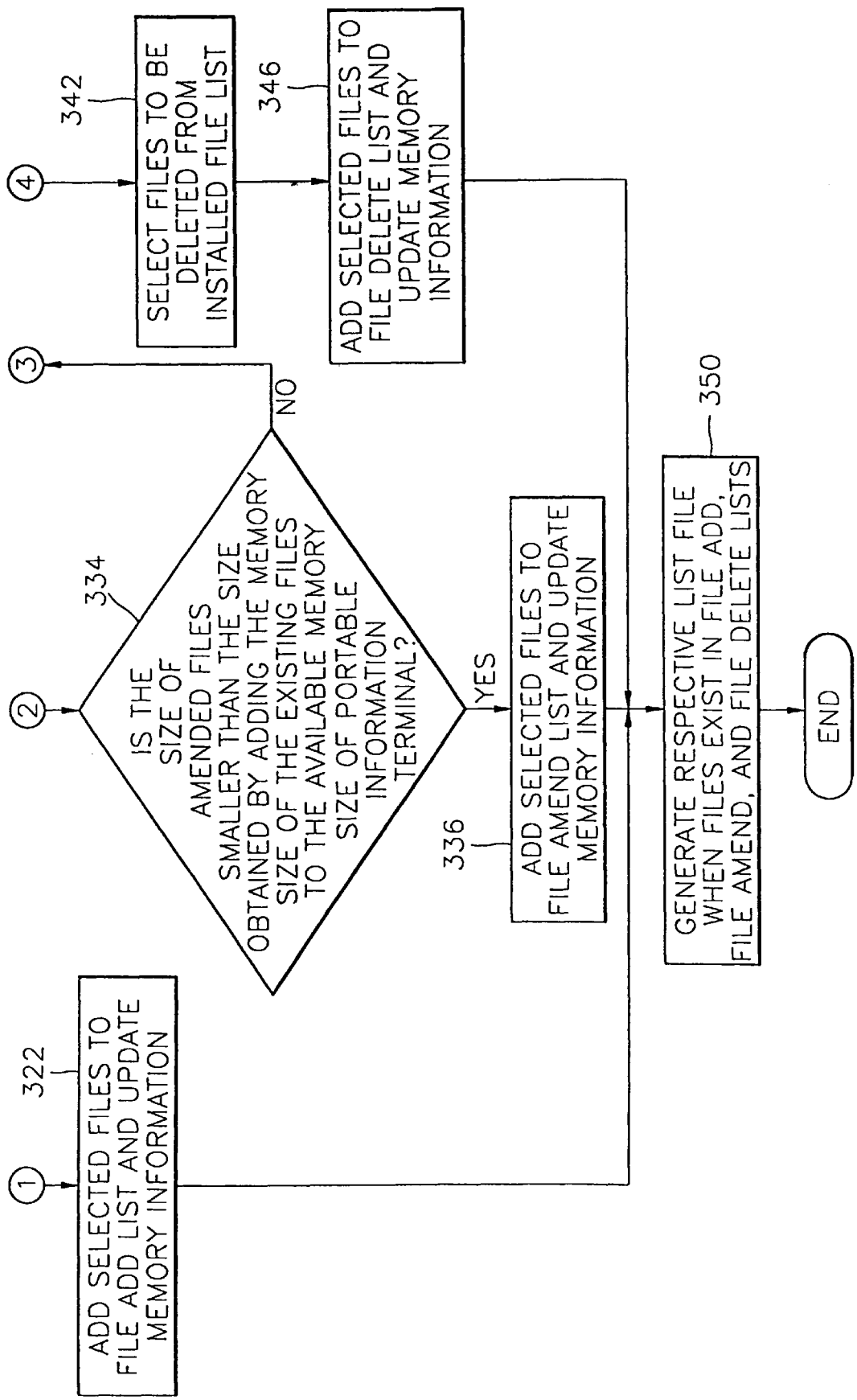

FIGS. 3A and 3B are a flowchart showing a method of managing files to be installed in a portable information terminal. The method includes the steps of reading installed file information and displaying the read file information in a form of a list (step 312), displaying the current state of use of the portable information terminal (step 314), adding files in the portable information terminal (steps 316, 318, 319, 320, and 322), amending files in the portable information terminal (steps 330, 332, 333, 334, and 336), deleting files from the portable information terminal (steps 340, 342, and 346), and generating files (step 350).

The master server adds new files, amends existing files, and deletes unnecessary files within a range which does not exceed the memory available in the portable information terminal when the files to be installed in the portable information terminal are to be changed. The information shown in FIG. 2 can be displayed on the screen of the master server or on an interface screen of a keypad.

The files installed in a portable information terminal are generally changed in the following three cases. First, new files are to be installed in the portable information terminal. In this case, the total size of the files to be installed must be smaller than the memory available in the portable information terminal. Second, there are files to be amended among the files installed in the portable information terminal. In this case, the total size of the files to be amended must be smaller than the size obtained by adding the memory size of the existing files to the size of the memory available in the portable information terminal. Third, when the files installed in the portable information terminal are no longer necessary, the files are deleted in order to provide more available memory in the portable information terminal.

In order to realize the above functions, as shown in FIGS. 3A and 3B, the master server connects to the portable information terminal, reads information on the files installed in the portable information terminal, and displays the file information in the portable information terminal file list display portion 210 (step 312). Also, the master server displays the total memory, the memory in use by the portable information terminal and the memory available in the portable information terminal total memory display portion 262, the portable information terminal memory in use display portion 264 and the portable information terminal memory available display portion 266, respectively (step 314).

The master server continuously checks whether the file add key 252, the file amend key 254, and the file delete key 256 for selecting the change of files have been depressed, and performs a respective function corresponding to any depressed key (steps 316, 330, and 340). Namely, whenever the user adds files, amends files, or deletes files, the master server compares the size of the required memory with the size of the memory available in the portable information terminal, displays this memory information, and displays error messages when the available memory is exceeded.

First, when the file add key 252 is depressed (step 316), the master server selects files after operation of a dialog box which allows selection of files to be newly added (step 318). Here, the master server adds the selected files to a file add list and updates the information on the size of the memory of the portable information terminal (step 322) when the size of the memory of the selected files is smaller than the memory available in the portable information terminal (step 320). When the size of the memory of the selected files is larger than the available memory of the portable information terminal (step 320), an error message is displayed (step 319) and the process returns to the step 318.

When the file amend key 252 is depressed (step 330), the master server selects the files to be amended (step 332). When the size of the memory of the files to be amended is smaller than the size obtained by adding the memory size of the existing files to the available memory (displayed in the portable information terminal memory available display portion 266) of the portable information terminal (step 334), the master server adds the selected files to a file amend list and updates the information on the memory size of the portable information terminal (step 336). On the other hand, if the available memory is exceeded, an error message is displayed on the screen and the process returns to the step 332 (step 333).

When the file delete key 252 is depressed (step 340), the master server selects the files to be deleted from the installed file list (step 342), adds the deleted files to the file delete list, and amends the information on the memory size of the portable information terminal (step 346).

Finally, when the added, amended, and deleted files are generated in the file add, file amend, and file delete lists in the steps 322, 336, and 346, respectively, the master server stores the file list to be changed in the user directory (step 350). The portable information terminal deletes files recorded on a file delete list and receives files to be upgraded when a file list to be changed is received from the master server.

Figure 4:
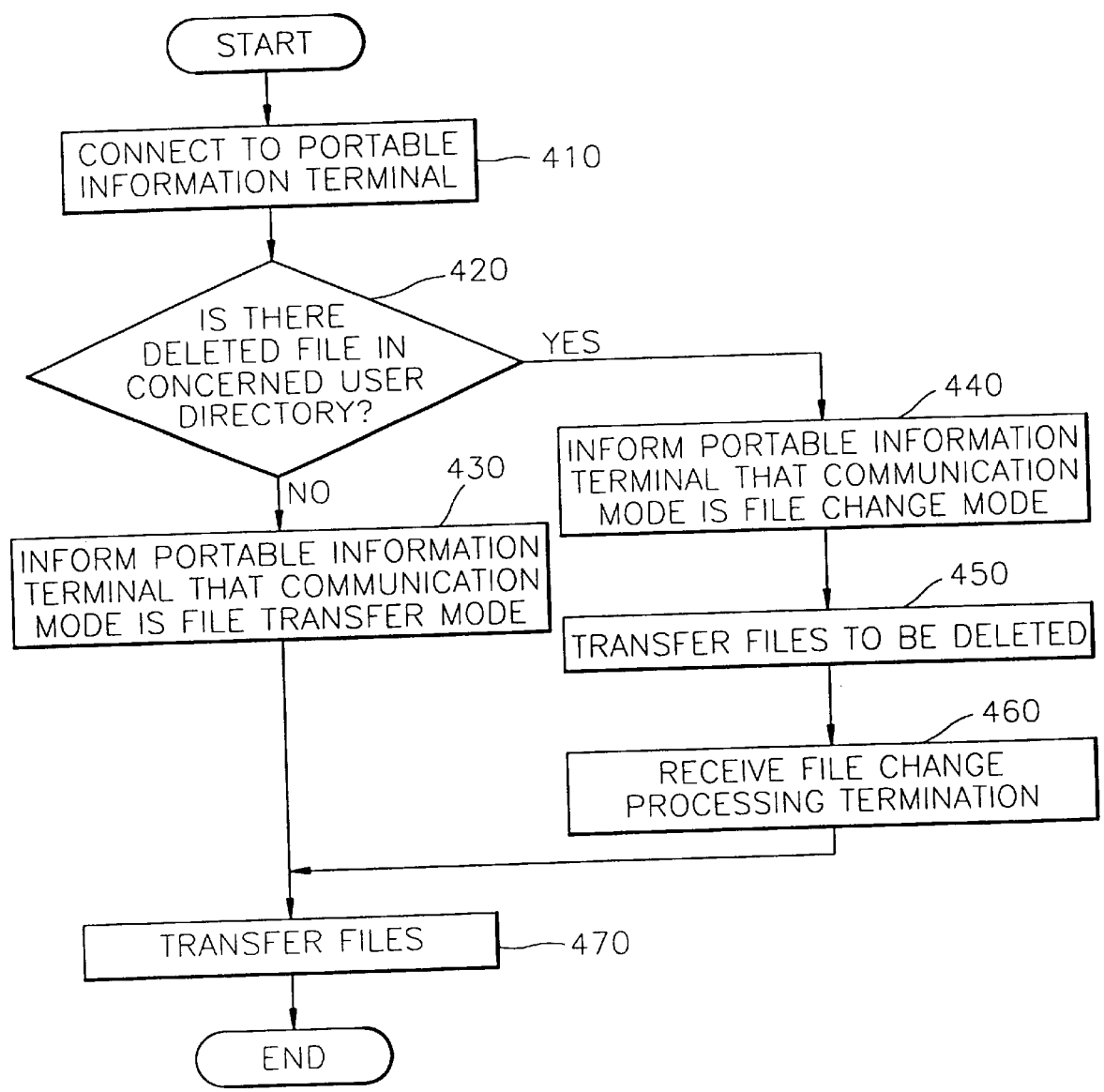
FIG. 4 is a flowchart showing a method for transferring files from the master server to the portable information terminal.

FIG. 4 is a flowchart showing a method for transferring files from the master server to the portable information terminal. As shown in FIG. 4, the master server connects to the portable information terminal (step 410). When the list of files to be deleted does not exist in the concerned user directory (step 420), the master server informs the portable information terminal that a communication mode is a file transfer mode (step 430) and transfers the files to be installed (step 470). When the list of files to be deleted exists in the user directory, the master server informs the portable information terminal that the communication mode is a file change mode (step 440) and transfers the concerned list of files to be deleted (step 450). Here, the master server automatically transfers files to be installed (step 470) when a file change processing termination is received from the portable information terminal (step 460).

Figure 5:
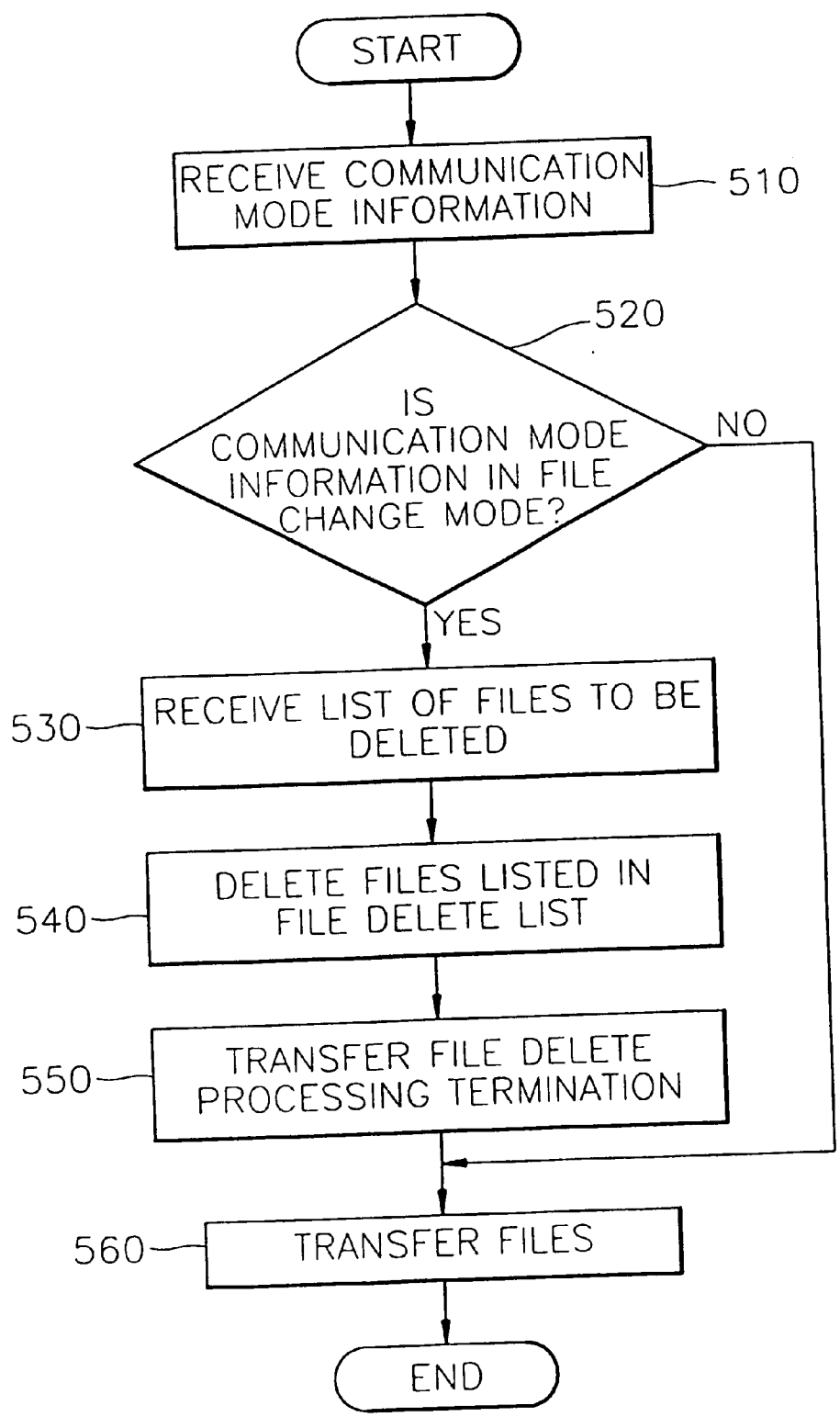
FIG. 5 is a flowchart showing a method for transferring files from the portable information terminal to the master server.

FIG. 5 is a flowchart for transferring files from the portable information terminal to the master server. As shown in FIG. 5, the portable information terminal receives communication mode information (i.e., information indicating a file transfer mode or a file change mode) from the master server (step 510). Here, the portable information terminal receives the list of files to be deleted (step 530), deletes the concerned files (step 540), transfers the file delete processing termination to the master server (step 550), and transfers the files to the master server (step 560) when the communication mode is a file change mode (step 520). Also, the portable information terminal transfers files to the master server (step 560) when the communication mode is not in a file change mode (step 520).

As mentioned above, according to the present invention, it is possible to easily manage files of the portable information terminal by solving the shortage of memory problem which occurs during transfer of files by collectively managing the files to be installed in the portable information terminal in the master server.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A method of managing files of a portable information terminal, comprising the steps of:
   comparing a memory size of files to be changed in the portable information terminal with a size of memory available in the portable information terminal;
   generating a list of files to be changed only when the memory size of the files to be changed is not greater than the size of the memory available in the portable information terminal;
   updating information on a memory size of the portable information terminal in a master server when the files are to be changed in the portable information terminal; and
   storing the generated list of files in a specific directory of the master server and transferring the list of files to be changed to the portable information terminal when the files are transferred to the portable information terminal.

2. The method of claim 1, wherein the changes to the files in the step (a) are adding, amending, and deleting the files.

3. The method of claim 1, wherein files are added when the size of the files to be changed is smaller than the size of memory available in the portable information terminal.

4. The method of claim 1, further comprising the step of displaying error messages when the size of the files to be changed is larger than the size of memory available in the portable information terminal.

5. The method of claim 1, wherein files in the portable information terminal are amended when the size of the files to be amended is smaller than the sum of a size of existing files and the size of memory available in the portable information terminal.

6. A method of managing files of a portable information terminal, comprising the steps of:

comparing a memory size of files to be changed in the portable information terminal with a size of memory available in the portable information terminal;

generating a list of files to be changed;

updating information on a memory size of the portable information terminal in a master server when the files are to be changed in the portable information terminal;

storing the generated list of files in a specific directory of the master server and transferring the list of files to be changed to the portable information terminal when the files are transferred to the portable information terminal; and calculating a change of memory information, displaying the calculated memory information on a screen, and generating a file list whenever files are to be changed.

7. The method of claim 1, wherein a file delete list is transmitted to the portable information terminal and the list of files to be changed is transferred to the portable information terminal when files to be changed exist in the concerned directory of the master server.

8. The method of claim 1, wherein the portable information terminal deletes files recorded on a file delete list received from the master server and receives the files to be changed.

* * * * *